UNITED STATES PATENT OFFICE.

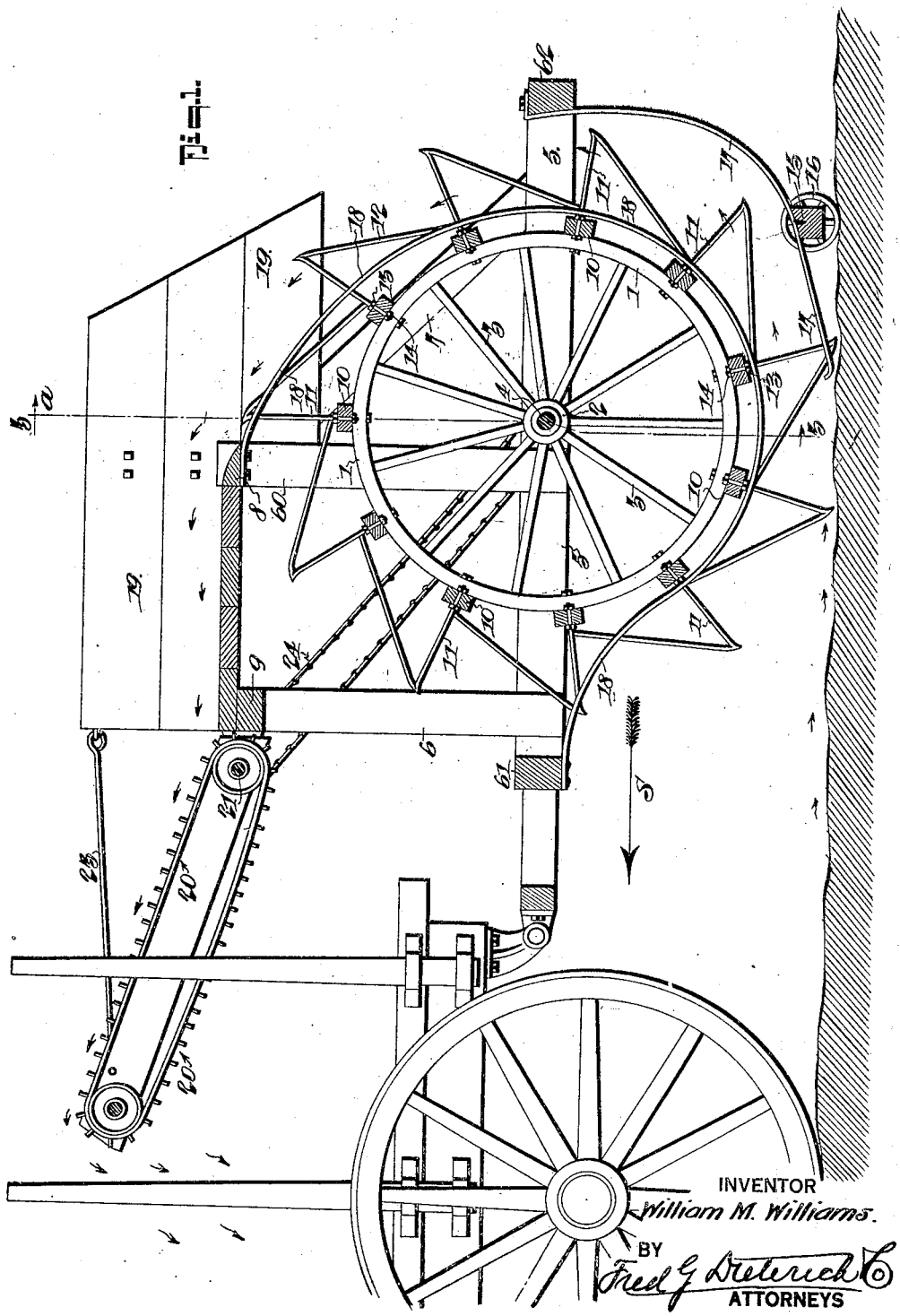

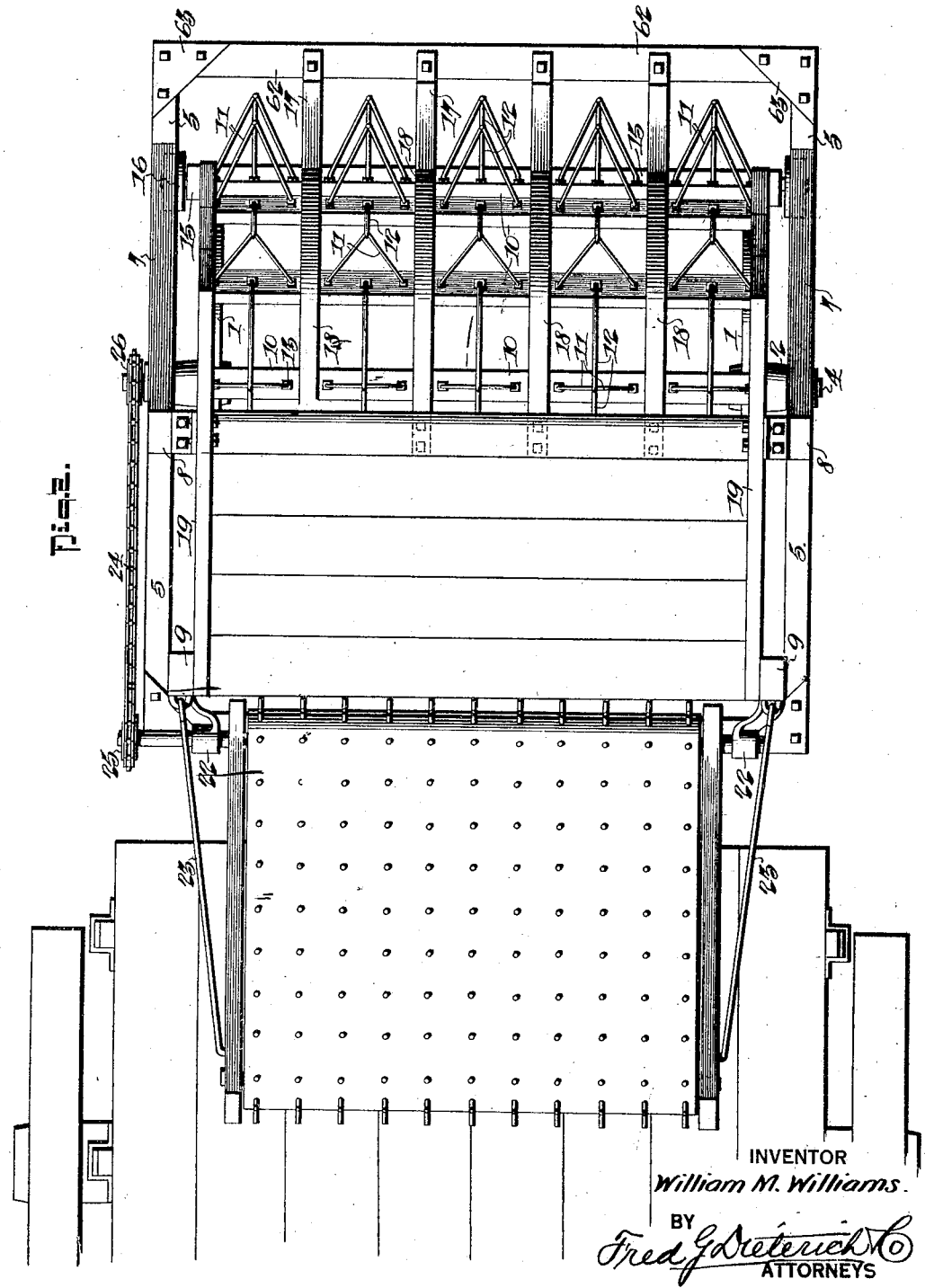

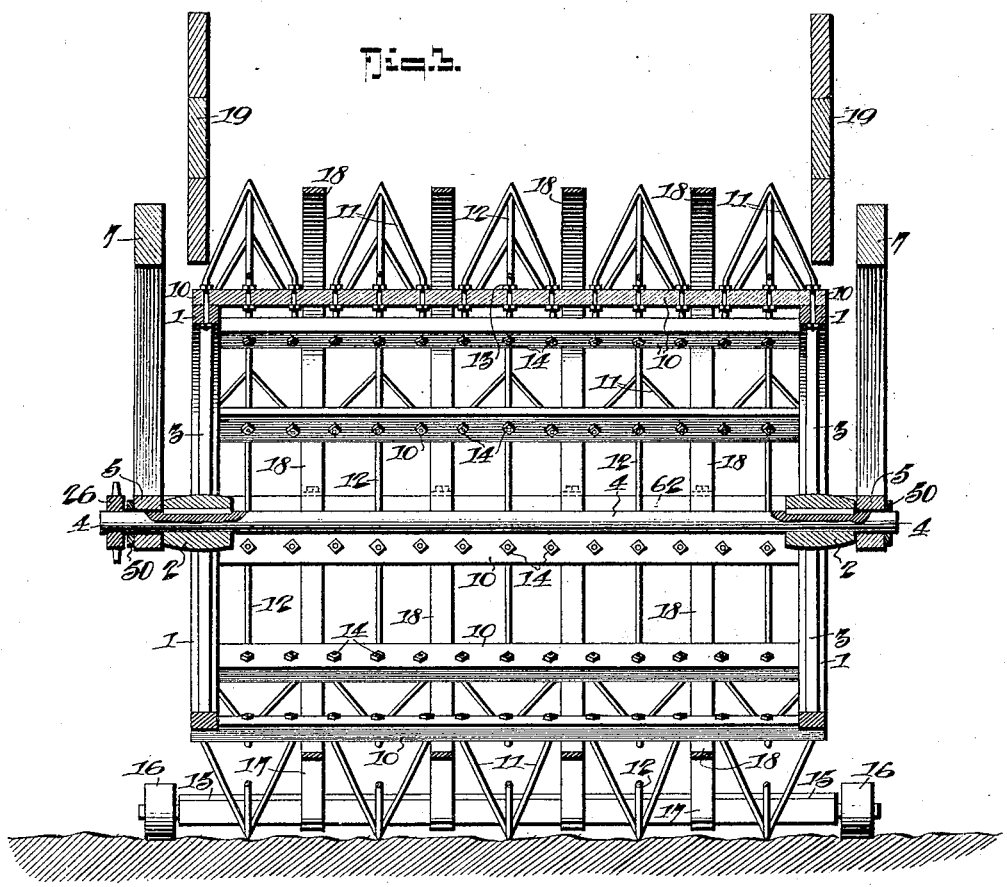

WILLIAM M. WILLIAMS, OF RENO, NEVADA, ASSIGNOR OF ONE-HALF TO WILLIAM DAWSON, OF RENO, NEVADA.

ALFALFA-HAY LOADER.

1,353,202.  Specification of Letters Patent.  Patented Sept. 21, 1920.

Application filed November 18, 1919. Serial No. 338,886.

*To all whom it may concern:*

Be it known that I, WILLIAM M. WILLIAMS, a citizen of the United States, residing at Reno, in the county of Washoe and State of Nevada, have invented a new and Improved Alfalfa-Hay Loader, of which the following is a specification.

This invention has reference to improvements in that class of hay loaders in which is included a rotary pick-up wheel or drum and means for conveying and loading the hay onto a wagon as it is being picked up or lifted and the machine travels along the field.

Primarily, my invention has for its object to provide a loading means of the general type referred to, of a simple and economical construction, that is more especially adapted for loading alfalfa hay and which effectively serves its intended purposes.

Another object of my invention is to provide, in a loader of the character stated, an improved construction of pick-up wheel or drum having the picker elements especially designed for lifting and delivering the gathered hay without breaking the hay or knocking off the leaves.

With other objects in view that will hereinafter be apparent, my invention comprehends, in a loading machine of the character stated, the peculiar details of construction and combination of parts set forth in the following description, specifically pointed out in the appended claims and illustrated in the accompanying drawings, in which:—

Figure 1 is a vertical longitudinal section of my improved construction of hay loader, so much of a wagon body, onto which the loader delivers the gathered hay, being shown, as is necessary to illustrate a practical application of my invention.

Fig. 2 is a plan view of the loader arranged as shown in Fig. 1.

Fig. 3 is a cross section of the loader taken on the line 3—3 of Fig. 1, and looking in the direction of the arrow *a*.

Fig. 4 is a detail perspective view which illustrates the construction and the manner of attaching one of the pick-up or lifter devices that constitutes a part of the picker wheel.

Briefly stated, my improved construction of hay loader comprises a suitable framing in which is mounted a pick-up wheel or drum, that is caused to revolve by ground contact, as the machine is drawn along the field, a receiving compartment that extends lengthwise of the frame over the pick-up wheel and into which the picked up hay is lifted and along which the gathered hay may be readily moved, and an elevator or carrier adapted for loading the gathered hay into a wagon to which the pick-up or gathering means are coupled, and by which they are dragged along to the rear of such wagon.

Referring now more particularly to the peculiar construction of the gathering or pick-up mechanism which constitutes the essential feature of my present invention, the arrangement of which is best shown in Figs. 1 and 3, it will be seen the rotary pick-up mechanism consists of two oppositely disposed end wheels, each wheel comprising a rim 1, a hub 2, and spokes 3, the latter connecting with the rim and the hub in the usual manner.

The wheel hubs 2 are mounted and keyed on an axle 4, the opposite ends of which are journaled in bearings 50—50 in the opposite side beams 5—5 of the framing, as is clearly shown in Fig. 3.

The framing referred to includes a pair of uprights 60—60 secured at their lower ends to each side beam 5 and front and rear horizontal cross beams 61—62, respectively, that connect with the front and rear ends of the side beams 5—5, and are braced by the angle plates 63—63 (see Fig. 2).

7—7 designate inclined braces which join with the rear uprights 60—60 and with their respective side beams 5—5. The upper ends of the rear uprights 60—60 are joined by a cross beam 8 and the upper ends of the front uprights 6—6 are likewise joined by a cross member 9.

The pick-up or gathering mechanism, before generally referred to, in its more complete make-up, includes a series of equidistant spaced cross rods 10, whose opposite ends are bolted to the opposite wheel rims 1—1 and each of which has a series of longitudinally extended equi-distant spaced apertures $10^a$, the reason for which will presently appear.

The pick-up or lifter devices are attached to and are projected radially from the said bars 10 and the said devices are so arranged that, as the machine is drawn along back of the wagon onto which the hay is to be loaded they contact with the ground and thereby cause the said pick-up or gathering mechanism to rotate backward and, at the same time penetrate the loose hay or straw, elevate it up to the receiving compartment from which it is passed onto the elevator or carrier and loaded into the wagon. The pick-up or lifter devices 11 are arranged along the cross bars 10, transversely with respect to the framing and in parallel longitudinal rows, as is best shown in Fig. 2.

In the preferred construction, as shown, each pick-up device includes a penetrating member or finger 11 that projects radially from the bar 10 to which it is attached. To provide for the desired effectiveness in its pick-up and lifting functions, and, at the same time, provide necessary strength and rigidity, the pick-up device is formed of a heavy steel wire rod, bent to an inverted V-shape with its ends 11ª shaped and threaded for being readily passed through a pair of apertures in the bar from which the said inverted V-shaped device is to be projected. The inverted V-shaped member, which constitutes the lifting finger 11, is rigidly held to its radially projected position and against lateral strain by a brace 12, also preferably of a heavy steel rod, which is welded or otherwise fixedly attached to the apex end of the finger 11 and which extends rearwardly from and at an incline to the member 11 and has its end terminating in a threaded angle member 12ª for passing through an aperture in the adjacent cross bar 10 at the rear of the bar 10 to which the finger 11 is attached. Each threaded end 11ª or 12ª of the members 11 or 12 is securely yet removably held in the apertures 10ª of the bars 10 by stay bolts 13 and 14 bearing against both top and bottom of the said cross bars, as is clearly shown in Fig. 3.

So far as described, it will be readily understood, by referring particularly to Fig. 1, that as the machine is drawn along the field in the direction of the arrow s, rotary motion is imparted to the pick-up and lifter mechanism in the backward direction.

By reason of shaping the pick-up or lifting devices in the manner shown and described, which provides for holding and bracing the radially projected fingers 11 under such rigidity that they are not readily broken or bent out of shape under ordinary usage of the machine, and furthermore the connection of the pick-up or lifter devices with the cross bars 10, as stated, serves to hold the said bars from loosening up or getting out of proper alinement.

15 indicates a bar which extends across the rear side of the rotary pick-up and lifter mechanism and mounted at its opposite ends, on roller bearings 16—16.

The bar 15 is positioned close up to the line of movement of the pick-up devices and to which are attached a series of spring rake teeth 17, the upper ends of which are secured to and suspended from the rear cross bar 62 of the framing.

The teeth 17 curve forwardly from the bar 62 to the bar 15 and constitute a pocket into which the hay is received as it is being gathered by the pick-up devices.

From the bar 15, the rake members extend forwardly between the devices 11 and constitute ways onto which the hay slides along as it is being gathered and lifted by the pick-up members.

Coöperating with the pick-up devices 11 is a means for clearing the said pick-up or lifter members as they travel in an upward direction. The said clearing means consists of a number of curved strap metal members 18, the upper ends of which are rigidly attached to the rear end of the bottom of the hay receiving compartment. The said members 18 curve downwardly and inwardly as closely adjacent the periphery of the rotary pick-up or lifting wheel as is possible without retarding the pathway of the cross bars 10 that constitute a part of the said pick-up wheel or drum, and are fastened to the bottom of the front cross bar 61.

The members 18—18 are spaced sufficiently apart to permit of the free passage of the widest portion of the pick-up and lifting device 11, and are sufficiently close to effect the desired clearing of the hay from the said devices as it reaches the entrance of the gathering compartment, through which it is moved along onto the elevator or carrier devices, as shown by the arrows in Fig. 1.

The gathering compartment is produced by fastening boards 19—19 to the uprights of the framing with the rear ends sufficiently projected to form side guards for the entrance of the hay as it is gathered and lifted toward the platform or bottom of the compartment.

20 designates an endless carrier or elevator which extends across the forward or discharging end of the gathering compartment. The inner end of the elevator 20 is hingedly connected to a power shaft 21 that is journaled, at its opposite ends, in bracket bearings 22—22 on the framing, and 23—23 indicate stay or hanger rods that connect with the discharging end of the carrier 20 and with the framing, as shown.

Motion is imparted to the carrier 20 by a transmission chain belt 24 which takes over a sprocket gear 25 on the shaft 21 and a like gear 26 on the axle of the rotary take-up wheel.

From the foregoing description, taken in connection with the accompanying drawings, the complete construction, the manner of its use and the advantages of my present invention, it is believed, will be readily apparent to those familiar with the use of machines of this kind.

The pick-up or lifter device, while of sufficient rigidity to maintain the drag frame under the proper conditions, during ordinary transportation over the field, will also operate to pick up, lift and gather the hay without danger of breaking the same or knocking off the leaves, the rake teeth at the end which extend some distance under the pick-up wheel, serving to constantly gather or bunch the hay sufficiently to provide for a positive lifting thereof, to the entrance end of the gathering compartment.

What I claim is:—

1. A loading attachment for wagons, comprising a frame, a pick-up drum rotatably mounted on the frame and including radially extended lifter fingers that rake up the hay as the drum is dragged along, an open-ended receiving compartment that extends lengthwise of the frame across the drum and through the entrance end of which the lifter fingers travel as they carry the gathered hay up over the drum, and means connected with the frame and actuated from the drum axle for discharging the material as it gathers in the receiving compartment onto the wagon.

2. A hay loading attachment adapted for being connected to the end of a wagon, comprising a frame, a pick-up drum rotatably mounted on the frame and including radially extended members that rake up the hay and lift it over the rear of the drum as the drum is dragged forwardly, an open-ended receiving compartment above the drum into which the lifted hay is conveyed, the opposite sides of the receiving end of the compartment constituting a throatway through which the lifter members pass as they travel in the forward or overhead direction, a means for pocketing the hay bunches elevated by the lifter members on the drum, the said means comprising a series of rake teeth attached at their upper ends to the rear end of the frame and extended downwardly and forwardly under the drum.

3. A hay loading attachment adapted for being connected to the end of a wagon, comprising a frame, a pick-up drum rotatably mounted on the frame and including radially extended members that rake up the hay and lift it over the rear of the drum as the drum is dragged forwardly, an open-ended receiving compartment above the drum into which the lifted hay is conveyed, the opposite sides of the receiving end of the compartment constituting a throatway through which the lifter members pass as they travel in the forward or overhead direction, means for pocketing the hay bunches elevated by the lifter members on the drum, said means comprising a drag bar having a wheel support at each end, and rake teeth attached to the bar that extend forwardly between the lifter members.

4. A hay loading attachment adapted for being connected to the end of a wagon, comprising a frame, a pick-up drum rotatably mounted on the frame and including radially extended members that rake up the hay and lift it over the rear of the drum as the drum is dragged forwardly, an open-ended receiving compartment above the drum into which the lifted hay is conveyed, the opposite sides of the receiving end of the compartment constituting a throatway through which the lifter members pass as they travel in the forward or overhead direction, means for pocketing the hay bunches elevated by the lifter members on the drum, said means comprising a drag bar having a wheel support at each end, rake teeth attached to the bar that extend forwardly between the lifter members, said teeth consisting of resilient members secured at their lower ends to and projected forwardly beyond the bar and secured at their upper ends to the frame in close relation to the hay lifter members whereby to provide for bunching or pocketing the hay as it is being lifted.

5. In a hay loading attachment for wagons that includes a rotary pick-up drum; lifter members that project radially from the drum body, the said members consisting of inverted V-shaped lifting faces and a rearwardly extended brace member for holding the faces to flatwise engage the head.

6. In a hay loading attachment for wagons that includes a rotary pick-up drum which includes oppositely disposed wheel frames and cross bars whose opposite ends connect with the said opposite frames, each of the said cross bars having a longitudinally extended series of definitely spaced apertures, and lifter members projected from the said bars, each of the lifter members including a front inverted V-shaped portion having threaded ends for passing through a pair of the apertures in one cross bar and a rearwardly extended brace member having a threaded end for engaging one of the apertures in an adjacent cross bar, and means for securing the threaded ends of the lifter members to said cross bars.

WILLIAM M. WILLIAMS.